(No Model.) 2 Sheets—Sheet 1.
R. M. FRANKLIN.
NET FOR CRABBING AND FISHING.
No. 446,440. Patented Feb. 17, 1891.
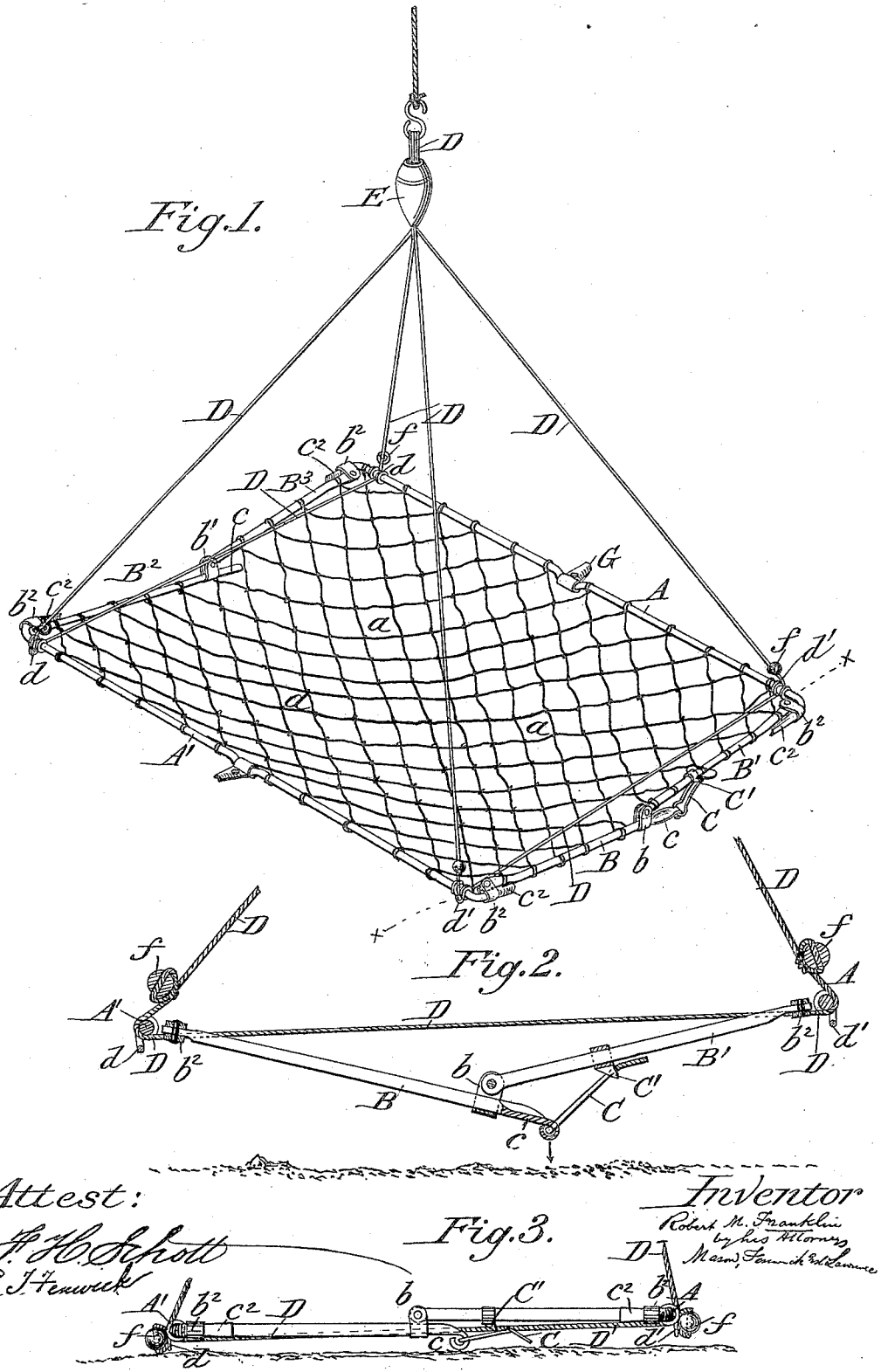
Attest:
F. H. Schott
E. J. Fenwick
Inventor
Robert M. Franklin
by his Attorneys
Mason, Fenwick & Lawrence

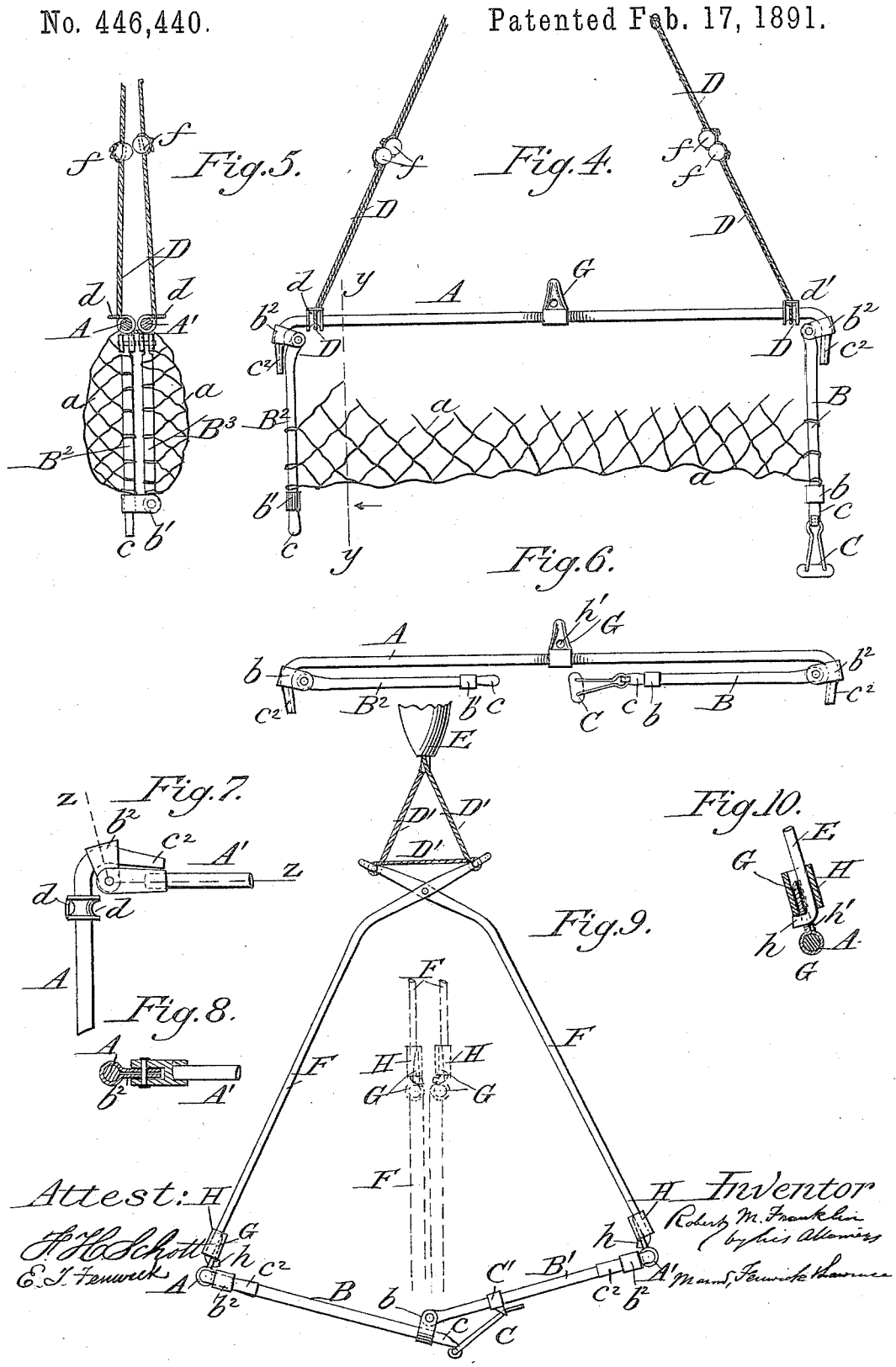

UNITED STATES PATENT OFFICE.

ROBERT M. FRANKLIN, OF GALVESTON, TEXAS.

NET FOR CRABBING AND FISHING.

SPECIFICATION forming part of Letters Patent No. 446,440, dated February 17, 1891.

Application filed May 12, 1890. Serial No. 351,386. (No model.)

*To all whom it may concern:*

Be it known that I, ROBERT M. FRANKLIN, a citizen of the United States, residing at Galveston, in the county of Galveston and State of Texas, have invented certain new and useful Improvements in Nets for Fishing, Crabbing, and other Similar Purposes; and I do hereby declare the following to be a full, clear, and exact description of the invention, such as will enable others skilled in the art to which it appertains to make and use the same.

My invention consists in certain novel constructions, combinations, and arrangements of parts in a crab or fish net whereby its manipulation while being used is rendered very convenient and its effectiveness increased; and, also, before and after use it can be folded very compactly, and thus much inconvenience avoided in its transportation to and from the crabbing and fishing localities.

In the accompanying drawings, Figure 1 is a perspective view of my improved crab or fish net as it appears partially spread and set and in the act of being lowered to the bed of a river or stream. Fig. 2 is a transverse section of the same just before it has reached the bed of the river or stream and before it is "unset." Fig. 3 is a similar view to Fig. 2, but showing the net as it appears after having reached the bed of the river or stream and has automatically unset itself. Fig. 4 is a side view, and Fig. 5 a cross-section, of the net in the line $y\ y$ of Fig. 4, showing it as it appears while being raised with its load of crabs or fish from the bed of the river. Fig. 6 is a detail view of the frame of the net, showing the same as folded for transportation. Fig. 7 is a top view of one corner of the frame of the net, showing a slightly-modified construction of the loose-joint connections. Fig. 8 is a section in the line $z\ z$, Fig. 7, of this modified construction; Fig. 9, an end view of the frame of the net, showing a modification of the devices used for spreading the net-frame and lowering and keeping it in position until it is unset automatically on the bed of the river or above the same; and Fig. 10 is a detail section showing more plainly the sliding sleeves which fasten the lower ends of the modified device shown in Fig. 9 to the net-frame.

A A' in the drawings designate the side bars, and B B' B$^2$ B$^3$ the end bars, of the frame of the net. This frame has the netting $a$ applied to it in the way shown or in any other suitable manner. The end bar B B' is formed with a loose-joint connection $b$, and B$^2$ B$^3$ with a loose-joint connection $b'$, and the same allow the net to spread, so as to lie horizontally, as shown in Fig. 3, and to so fold that the two parts of the respective end bars shall stand vertical and close to one another, as shown in Fig. 5.

The position shown in Fig. 3 is the one the net occupies, either on or above the bed of the river, while adjusted for catching crabs or fish with the bait tied to it, as usual, and the position shown in Fig. 5 that which it is caused to assume while being raised with crabs or fish within the net-work. One part of each of the end bars is formed with a stop-extension $c$, which prevents the net-frame from bowing upward after it has spread to a horizontal position. The side bars are jointed loosely to the outer extremities of the end bars by means of loose-joint connections $b^2$, and each bar is formed with a right-angular stop-extension $c^2$, said extensions serving to keep the end bars at a right angle with the side bars when the net is fully spread and lying horizontally upon or above the bed of the river.

The extensions $c\ c^2$ render the bars of the net-frame practically rigid against upward and outward lateral movements independently of one another when the net is lying upon or above the bed of the river. The frame may be rectangular or oval in form, as desired. If made oval, the side and end bars will be curved, so as to give the ends and sides of the net-frame a bowing form.

The loose-joint connections $b\ b'$ of the net-frame permit the frame to fold, as illustrated in Figs. 4 and 5, so as to inclose and retain the crabs or fish while raising the net, and the joint connections $b^2$ at the corners permit the end bars, after being folded so as to stand vertically, as in said figures, to fold horizontally and lie longitudinally close alongside the side bars, as shown in Fig. 6.

By providing for the folding of the bars, as in Fig. 6, the net can be brought into a very compact condition for transportation to and from the fishing-grounds.

For setting and holding the net while being lowered in nearly a fully-spread condition, as in Figs. 1 and 2, a broad-surfaced trigger plate or device C is hinged to the part B of an end bar, and said plate or device is slotted to admit through it a V or other suitably-shaped retaining-catch C' on the part B' of said end bar, as illustrated in the drawings. The trigger plate or device by being hooked upon the catch serves for keeping the frame from assuming a horizontal position while the net is suspended and being lowered, and also keeps the net partly spread; but as soon as the net is suddenly jerked upwardly the trigger plate or device is by the resistance of the water instantly released from the catch and drops down, and thereupon the frame immediately assumes the horizontal position shown in Fig. 3, either on or above the bed of the river.

If the net is used on the bed of the river, it automatically releases the trigger-plate by the gravity of the sections causing the net to spread out fully; but should the trigger not be released by this means a slight upward jerk will effect its release. For lowering the frame and keeping it in a properly-spread condition and also aid in folding it two cords D D, united centrally over the net to an adjustable float or buoy E, are supplied to the net, one cord being passed across the net and through offsetting eyes $d$ $d$ at one end of the frame, and its ends carried up through the float or buoy, and the other cord passed across the net and through similar eyes $d'$ $d'$ at the other end of the frame, and thence up through the float or buoy, and the four ends of the cords being connected above the float or buoy to a suitable S-shaped hook, to which a suspension-cord may be fastened, said cord being fastened to a stake or other object. On the cords D D stops $f$, in form, preferably, of balls, are fastened at points which will just permit the frame to spread to a horizontal position, and when this occurs they come in contact with the eyes $d$ $d'$ and act as means to keep the frame in that condition, steadying it and preventing it having movements upward or otherwise, which would tend to frighten the crabs or fish and interfere with its perfect operation. The cords D D, by being arranged incliningly from the float to the corners of the frame and passed across the ends of the same, as shown and described, serve for closing the net in the most effective and speedy manner as soon as the weight of the net is suspended upon them, which is caused to take place by raising the buoy or float out of the water and lifting the net by the suspending-cord.

The float E serves for keeping the cords taut when the net is resting on the bottom of the river, and the arrangement of the cords to cross at the ends of the net is important, as when thus arranged they are not liable to disturb the fish in closing the net, and at the same time, in connection with the stops, the cords aid in keeping the net balanced in a horizontal position when in use either on or above the bed of the river.

The hinge-joint connections may be in form of a loop fitted over or fastened to the angular extensions of the side bars A A', and receiving between its bifurcations the outer extremities of the end bars B B' B² B³, as illustrated in Fig. 4; or these connections may be in form of a loop having its ends inserted between the bifurcated ends of tips attached to the end bars, as illustrated in Figs. 7 and 8. Instead of employing the cords D D for lowering and closing the net, a pair of levers F, as shown in Fig. 9, may be adopted for this purpose. The lower ends of the levers F F have a slight hook $h$ formed on each of them, which hook formations enter holes $h'$ in lugs G, attached centrally to the side bars A A', as shown. By means of sliding sleeves H on the levers F the hooked ends $h$ of the levers are retained in the holes $h'$ of the lugs levers G, as will be fully understood from Figs. 9 and 10.

The lugs G are free to turn on the side bars A A', in order to allow the levers F to spread at their lower ends when the net assumes a horizontal position on the bed of the river. A cord D' is attached to the short arms of the levers F, and its ends are passed up through the float E and connected to the suspending hook and cord. In all other respects the net is constructed and provided with trigger plate and catch, as in the other figures of the drawings.

It will be understood that the trigger device will operate well without the broad-surfaced plate on its free end, especially when the net is lowered for use on the bed of the river and opens fully by the gravity of its sections, causing it to lie horizontally, and thereby releases the catch; but for fishing both above and on the bed of the river the broad-surfaced trigger-plate is very useful.

What I claim as my invention is—

1. A net for fishing, crabbing, or other analogous uses, comprising suitable lowering, spreading, and folding means, netting, side bars having horizontal angular end extensions and loose-joint connections, and end bars, each formed of two parts united by a loose-joint connection and also connected at their extremities to the side bars by the loose-joint connections of said side bars, and one part of each of the side bars formed with a stop connection, all substantially as and for the purpose described.

2. The combination of the jointed end bars, set trigger connected to one part of one of the jointed end bars, the trigger-catch attached to the other part of the said jointed end bar, and the netting and side bars, substantially as described.

3. The combination of the jointed end bars, set trigger connected to one part of one of the jointed end bars, the trigger-catch attached to the other part of the said jointed end bar, the netting, the side bars, guiding-eyes near the corners of the net, and the cords passed through said eyes and across the ends of the net and united centrally over the net to a suspending-cord, substantially as described.

4. The combination of the folding net, cords passed across the ends of the same and provided with stops, and the float or buoy, substantially as and for the purpose described.

5. A net-frame provided with jointed end bars, which are jointed to the side bars, the joints in the end bars being at right angles to the joints by which they are connected to the side bars, and said joints constructed and arranged substantially as and for the purpose described.

6. The combination of the jointed end bars, broad-surfaced set and releasing trigger-plate connected to one part of one of the jointed end bars, the trigger-catch attached to the other part of the said jointed end bar, and the netting and side bars, substantially as described.

In testimony whereof I hereunto affix my signature in presence of two witnesses.

ROBERT M. FRANKLIN.

Witnesses:
J. P. KINDRED,
J. T. McCLANAHAN.